(12) United States Patent
Axness et al.

(10) Patent No.: US 9,863,854 B2
(45) Date of Patent: Jan. 9, 2018

(54) SYSTEM AND METHOD FOR PRESENTING INFORMATION IN AN INDUSTRIAL MONITORING SYSTEM

(71) Applicant: General Electric Company, Schenectady, NY (US)

(72) Inventors: Brian Martin Axness, Gardnerville, NV (US); Trevor Shaun Kavanaugh, Minden, NV (US); Barrett Joseph Fuhrmann, Jr., Carson City, NV (US)

(73) Assignee: General Electric Company, Schenectady, NY (US)

( * ) Notice: Subject to any disclaimer, the term of this patent is extended or adjusted under 35 U.S.C. 154(b) by 1166 days.

(21) Appl. No.: 13/958,495

(22) Filed: Aug. 2, 2013

(65) Prior Publication Data
US 2015/0039266 A1 Feb. 5, 2015

(51) Int. Cl.
*G01M 99/00* (2011.01)
*G05B 19/418* (2006.01)
*G05B 23/02* (2006.01)

(52) U.S. Cl.
CPC ..... *G01M 99/005* (2013.01); *G05B 19/41875* (2013.01); *G05B 23/0272* (2013.01)

(58) Field of Classification Search
USPC ........................................................ 702/182
See application file for complete search history.

(56) References Cited

U.S. PATENT DOCUMENTS

| | | | | |
|---|---|---|---|---|
| 5,812,394 A | * | 9/1998 | Lewis | G05B 19/0426 700/17 |
| 2002/0161940 A1 | | 10/2002 | Eryurek et al. | |
| 2005/0012608 A1 | * | 1/2005 | Havekost | G05B 23/0272 340/517 |
| 2006/0020423 A1 | * | 1/2006 | Sharpe, Jr. | C10G 11/187 702/183 |
| 2010/0082396 A1 | * | 4/2010 | Caldwell | G06Q 10/063116 705/7.16 |
| 2012/0121055 A1 | * | 5/2012 | Yokoyama | G21D 3/008 376/259 |

(Continued)

OTHER PUBLICATIONS

European Search Report and Opinion issued in connection with corresponding EP Application No. 14178548.5 dated Jan. 9, 2015.

(Continued)

*Primary Examiner* — Paul D Lee
(74) *Attorney, Agent, or Firm* — Fletcher Yoder, P.C.

(57) ABSTRACT

A system includes an industrial monitor communicatively coupled to at least one sensor that is coupled to a mechanical system. The industrial monitor is configured to determine at least one type of measurement regarding the operation of the mechanical system, wherein each type of measurement is associated with one or more measurements determined by the industrial monitor based on one or more inputs received from the at least one sensor. Additionally, the system includes a display device communicatively coupled to the industrial monitor, wherein the display device is configured to display the at least one type of measurement determined by the industrial monitor. Further, each type of measurement is displayed with an appearance that denotes a combined status of the one or more measurements associated with the type of measurement.

20 Claims, 6 Drawing Sheets

(56) References Cited

U.S. PATENT DOCUMENTS

2012/0123747 A1    5/2012  Kubli et al.
2014/0244343 A1*   8/2014  Wilson ............... G06Q 10/0635
                                                            705/7.28

OTHER PUBLICATIONS

U.S. Appl. No. 13/958,500, filed Aug. 2, 2013, Fuhrmann, Jr., et al.
U.S. Appl. No. 13/958,506, filed Aug. 2, 2013, Fuhrmann, Jr., et al.
U.S. Appl. No. 13/958,511, filed Aug. 2, 2013, Axness et al.
3500 ENCORE System Overview, Bently Nevada* Asset Condition Monitoring, pp. 1-7, http://www.ge-mcs.com/download/monitoring/288080[1].pdf, accessed Jan. 29, 2013.
3500 ENCORE* Series, Machinery Protection System, Bently Nevada* Asset Condition Monitoring, GE Energy Measurement & Control Solutions, http://www.ge-mcs.com/download/monitoring/GEA18403-3500-Encore-Series_r15.pdf, accessed Jan. 29, 2013.

* cited by examiner

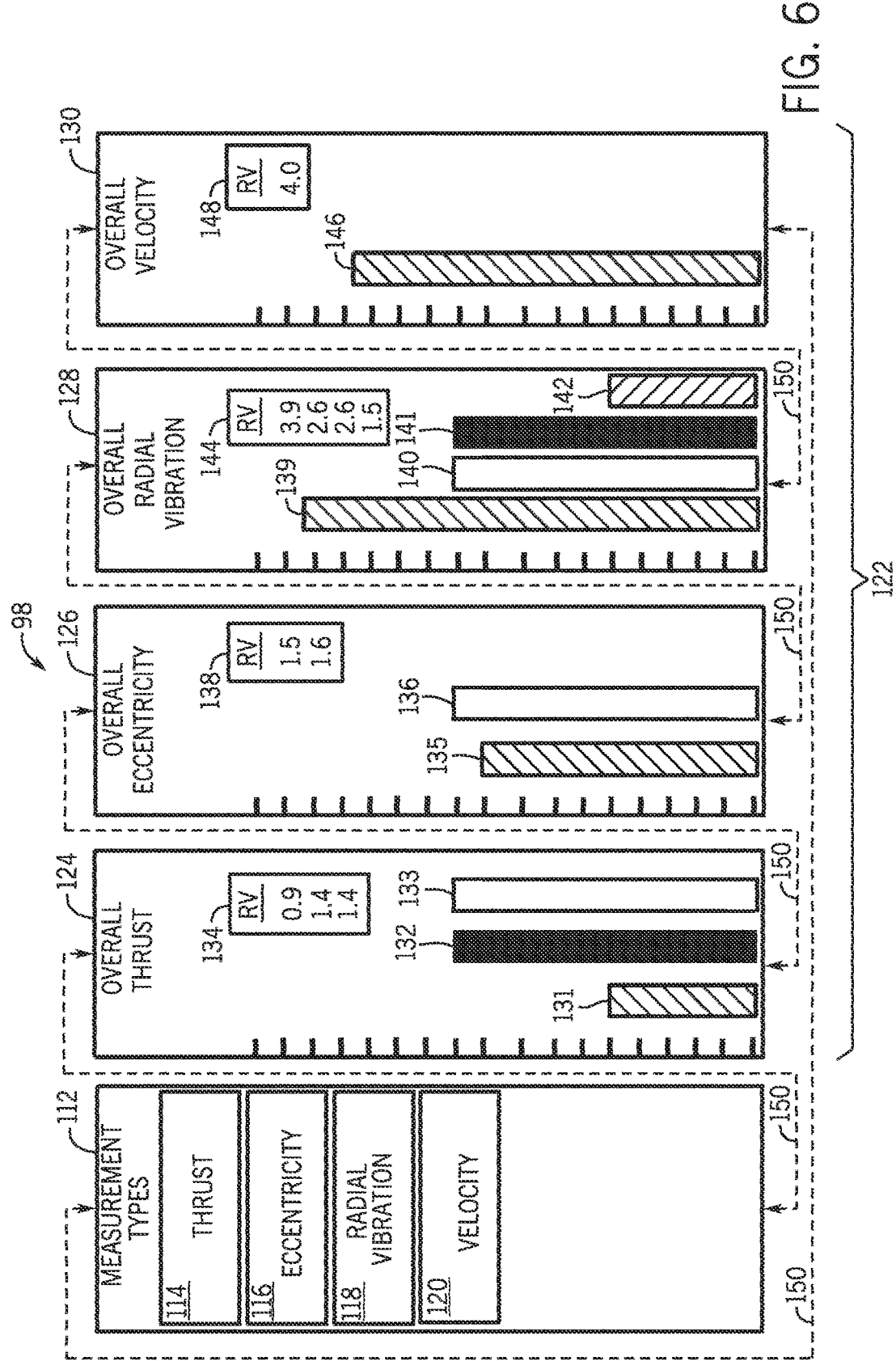

SYSTEM AND METHOD FOR PRESENTING INFORMATION IN AN INDUSTRIAL MONITORING SYSTEM

BACKGROUND OF THE INVENTION

The subject matter disclosed herein relates to industrial monitoring systems, such as asset condition monitoring systems.

Industrial monitoring systems, such as asset condition monitoring systems, generally provide monitoring capabilities for various types of mechanical devices and systems. For example, an industrial monitor may monitor one or more operational parameters of a gas turbine system. By specific example, the industrial monitoring system may include a number of sensors (e.g., temperature sensors, pressure sensors, flow sensors, and so forth) disposed throughout the gas turbine system. Such sensors may allow the industrial monitoring system to determine parameters of the mechanical system based, at least in part, on input received from these sensors. Additionally, certain industrial monitoring systems may include one or more graphical user interfaces (GUIs) that may be used to present (e.g., to an operator) the determined parameters of the mechanical system being monitored.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes an industrial monitor communicatively coupled to at least one sensor that is coupled to a mechanical system. The industrial monitor is configured to determine at least one type of measurement regarding the operation of the mechanical system, wherein each type of measurement is associated with one or more measurements determined by the industrial monitor based on one or more inputs received from the at least one sensor. Additionally, the system includes a display device communicatively coupled to the industrial monitor, wherein the display device is configured to display the at least one type of measurement determined by the industrial monitor. Further, each type of measurement is displayed with an appearance that denotes a combined status of the one or more measurements associated with the type of measurement.

In another embodiment, a method includes receiving inputs from a plurality of sensor devices coupled to mechanical device and determining a plurality of measurements for the mechanical device based on the received inputs, wherein each of the plurality of measurements is associated with a respective measurement status and a respective measurement type. The method includes displaying a user interface on a display device, wherein the user interface is configured to display a list of measurement types associated with the plurality of measurements, wherein each measurement type in the list is presented with at least one feature that is configured to progressively change to indicate the respective measurement statuses of the plurality of measurements associated with the measurement type.

In another embodiment, a non-transitory, computer-readable medium stores instructions executable by a processor of an electronic device. The instructions include instructions to receive inputs from at least one sensor coupled to a mechanical system. The instructions include instructions to determine a plurality of measurements, each associated with a measurement type of a plurality of measurement types, based on the inputs received from the at least one sensor. The instructions also include instructions to present, on a display device, a representation for each of the plurality of measurement types that includes a visual indication of a combined measurement status of the plurality of measurements associated with the measurement type.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is a diagram illustrating a number of screens for an embodiment of the GUI;

DETAILED DESCRIPTION OF THE INVENTION

Figure 1:
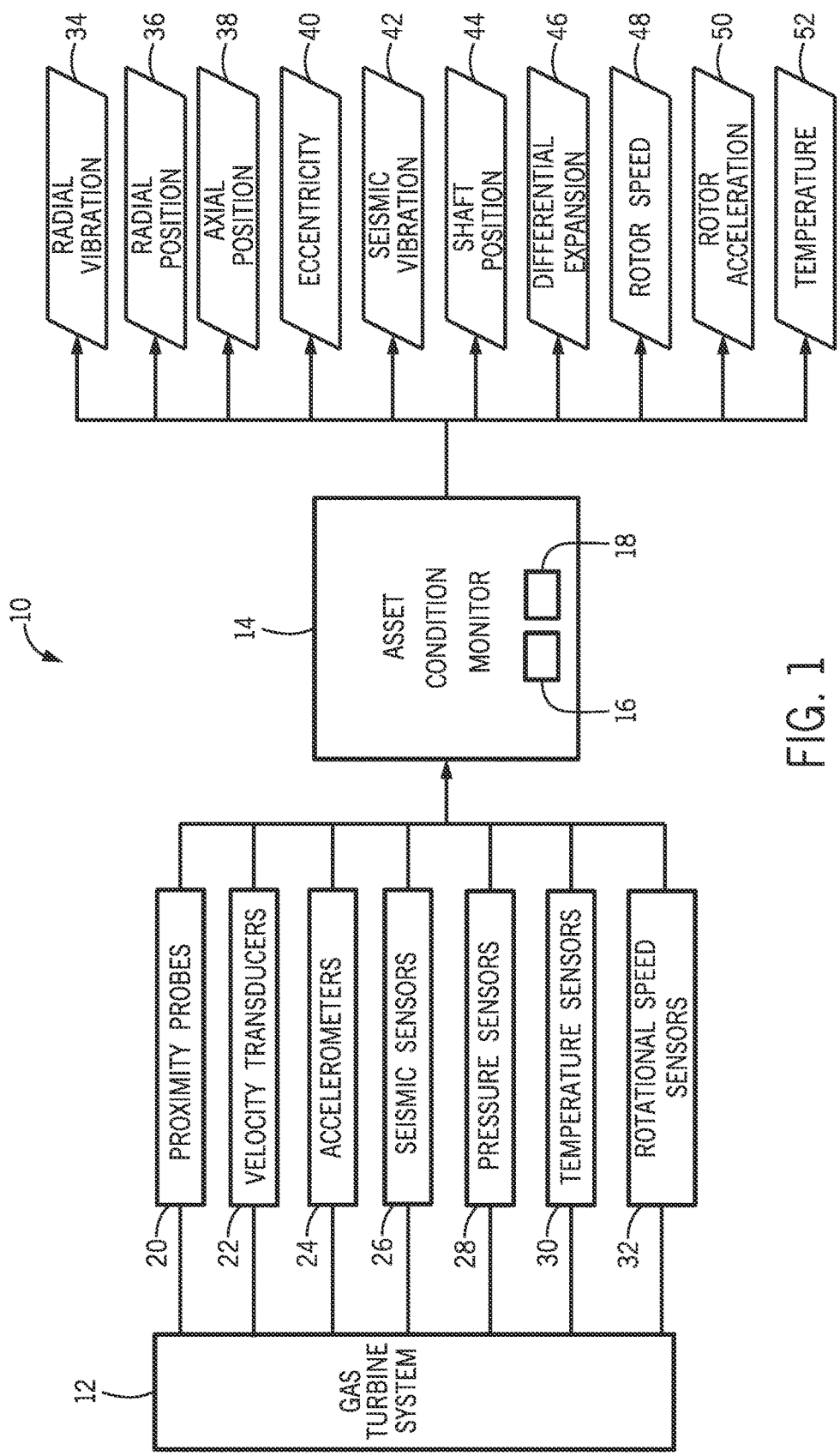
FIG. 1 is a diagram illustrating an embodiment of an industrial monitoring system, including certain inputs and outputs of the monitoring system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As set forth above, industrial monitoring systems generally enable the monitoring of one or more operational parameters of a mechanical device or system, such as a turbomachine system, a power generation system, a gasification system, or a chemical production system. For example, the disclosed embodiments may be used or integrated with a gas turbine system, a stream turbine system, a combined cycle system, a power plant, or any combination thereof. An industrial monitoring system may include a number of sensors coupled to portions of a mechanical device to measure aspects of the mechanical device during operation. These sensors may include, for example, temperature sensors, pressure sensors, flow rate sensors, clearance sensors, proximity sensors, flame sensors, gas composition sensors, vibration sensors, current sensors, voltage sensors, other suitable sensors, or combinations thereof. Accordingly, the industrial monitor may include a number of channels, each of which may receive input from one or more sensors to determine one or more measurements for the mechanical device or system. Furthermore, the industrial monitor may determine an appropriate status for each measurement based, at least in part, on the value of each condition or measurement relative to one or more predetermined threshold values.

As such, present embodiments are directed towards an industrial monitoring system that includes one or more display devices (e.g., disposed on the industrial monitor, a workstation, a portable monitoring device, a smart phone device, or another suitable device) to allow the industrial monitoring system to display a graphical user interface (GUI) to an operator. Further, the GUI may include various screens to display, for example, names for the channels of the industrial monitor as well as the measurements collected by each channel. The display devices of the industrial monitoring system may have limited dimensions, which, in turn, may limit the available screen space to display information.

Accordingly, present embodiments include features, discussed in detail below, that are generally directed toward maximizing an amount of information conveyed by each screen of the GUI displayed on the display devices. Present embodiments may use, for example, one or more visual effects or cues to convey to the operator a combined measurement status for each channel of the industrial monitor. This may allow the operator to determine, for example, that one or more channels include a measurement having an irregular status (e.g., a currently alarming or latched alarm status) without the operator having to navigate through several screens of the GUI to make a similar determination. Accordingly, present embodiments provide an efficient GUI that may enable an operator to more quickly identify and address an issue (e.g., one or more irregular measurement statuses) in the monitored mechanical device or system.

With the foregoing in mind, FIG. 1 illustrates an industrial monitoring system 10 for monitoring various operational parameters of a gas turbine system 12. It may be appreciated that, while a gas turbine system 12 is provided as one example of a monitored mechanical system, in other embodiments, the industrial monitoring system 10 may be used to monitor operational parameters of any mechanical devices or mechanical systems. For example, the industrial monitoring system 10 may be used to monitor operational parameters of axial compressors, screw compressors, gears, turbo-expanders, horizontal and vertical centrifugal pumps, electric motors, generators, fans, blowers, agitators, mixers, centrifuges, pulp refiners, ball mills, crushers, pulverizers, extruders, pelletizers, cooling towers, heat exchangers, or other suitable mechanical devices. Further, the industrial monitoring system 10 may be used to measure one or more mechanical devices of larger mechanical systems (e.g., steam turbine systems, hydraulic turbine systems, wind turbine systems, reactors, gasifiers, gas treatment systems, industrial automation systems, or other suitable mechanical systems).

The industrial monitoring system 10 illustrated in FIG. 1 includes an asset condition monitor 14, hereinafter referred to as monitor 14, including at least one processor 16 and memory 18. The monitor 14 illustrated in FIG. 1 is coupled to a number of sensors, including clearance sensors or proximity probes 20, velocity transducers 22, accelerometers 24, vibration or seismic sensors 26, pressure sensors 28, temperature sensors 30, and rotational speed sensors 32. It should be appreciated that the sensors 20, 22, 24, 26, 28, 30, and 32 are merely provided as examples, and that any other sensors (e.g., flow sensors, gas composition sensors, magnetic field sensors, flame sensors, current sensors, voltage sensors, and so forth) may be used that are suitable for performing measurements relevant to the operation and performance of a mechanical device or system (e.g., gas turbine system 12).

As illustrated in FIG. 1, the various sensors 20, 22, 24, 26, 28, 30, and 32 that are communicatively coupled to the monitor 14 may provide the monitor 14 with input such that the monitor 14 may, using the processor 16 and memory 18, determine one or more operational parameters of the monitored mechanical system (e.g., the gas turbine system 12). For example, the illustrated monitor 14 may receive input from measurements of the rotational speed of a shaft of the gas turbine system 12 from one or more rotational speed sensors 32, and may determine operational parameters (e.g., the rotation rate of the shaft, power output or load of the gas turbine system 12, or any other suitable operational parameter) based on the input received from the one or more rotational speed sensors 32, as well as other sensors functionally coupled to the gas turbine system 12. It may be appreciated that, as set forth in detail below, in certain embodiments, each operational parameter of the monitored mechanical system may be determined by a single channel of the monitor 14, and each channel of the monitor 14 may determine one or more measurements (e.g., based on the inputs received from the sensors 20, 22, 24, 26, 28, 30, and 32) in order to determine the operational parameter.

FIG. 1 illustrates some example operational parameters of the monitored mechanical system (e.g., gas turbine system 12) that may be determined (e.g., calculated or estimated) by the monitor 14 based on the various inputs received from sensors 20, 22, 24, 26, 28, 30, and 32. For the embodiment illustrated in FIG. 1, the monitor 14 may determine radial vibration 34, radial position 36, axial position 38, eccentricity 40, seismic vibration 42, shaft position 44, differential expansion 46, rotor speed 48, rotor acceleration 50, temperature 52, and/or any other suitable operational parameter of the gas turbine system 12, or any component thereof (e.g., compressors, shafts, pumps, valves, etc.). For example, the monitor 14 may use the processor 16 and memory 18 to process input from one or more proximity probes 20 to determine a differential expansion 46 of a casing of turbine section of the gas turbine system 12. By further example, the monitor 14 may process input from one or more rotational speed sensors 32 and/or one or more accelerometers 24 to determine rotor acceleration 50 of a shaft of the gas turbine system 12.

In certain embodiments, a number of monitors (e.g., monitor 14) may be combined in a modular fashion to form a modular monitoring system. For example, the modular asset condition monitoring system 60 illustrated in FIG. 2, hereinafter referred to as monitoring system 60, includes a number of modules suitable for performing particular functions during operation of the monitoring system 60. For example, in the embodiment of the monitoring system 60 illustrated in FIG. 2, a power supply module 61 may receive alternating current (AC) or direct current (DC) power and perform any suitable power conversions to provide power to the monitoring system 60. In other embodiments, the power supply module 61 may not be a module of the modular asset condition monitoring system 60, but may rather be a separate component coupled to the modular asset condition monitoring system 60. The illustrated monitoring system 60 also includes a system monitor or transient data interface (TDI) 62, which may provide the monitor's primary interface to the configuration, display, condition and monitoring software, and to external control systems. For example, the TDI 62 may support suitable communication protocols to communicatively couple the monitoring system 60 to other monitoring systems 64, to control systems 66 (e.g., process control systems, historians, and other plant control and automation systems), to computer workstations 68, to portable monitoring devices 70, to portable computing devices 72, and/or other suitable devices.

Figure 2:
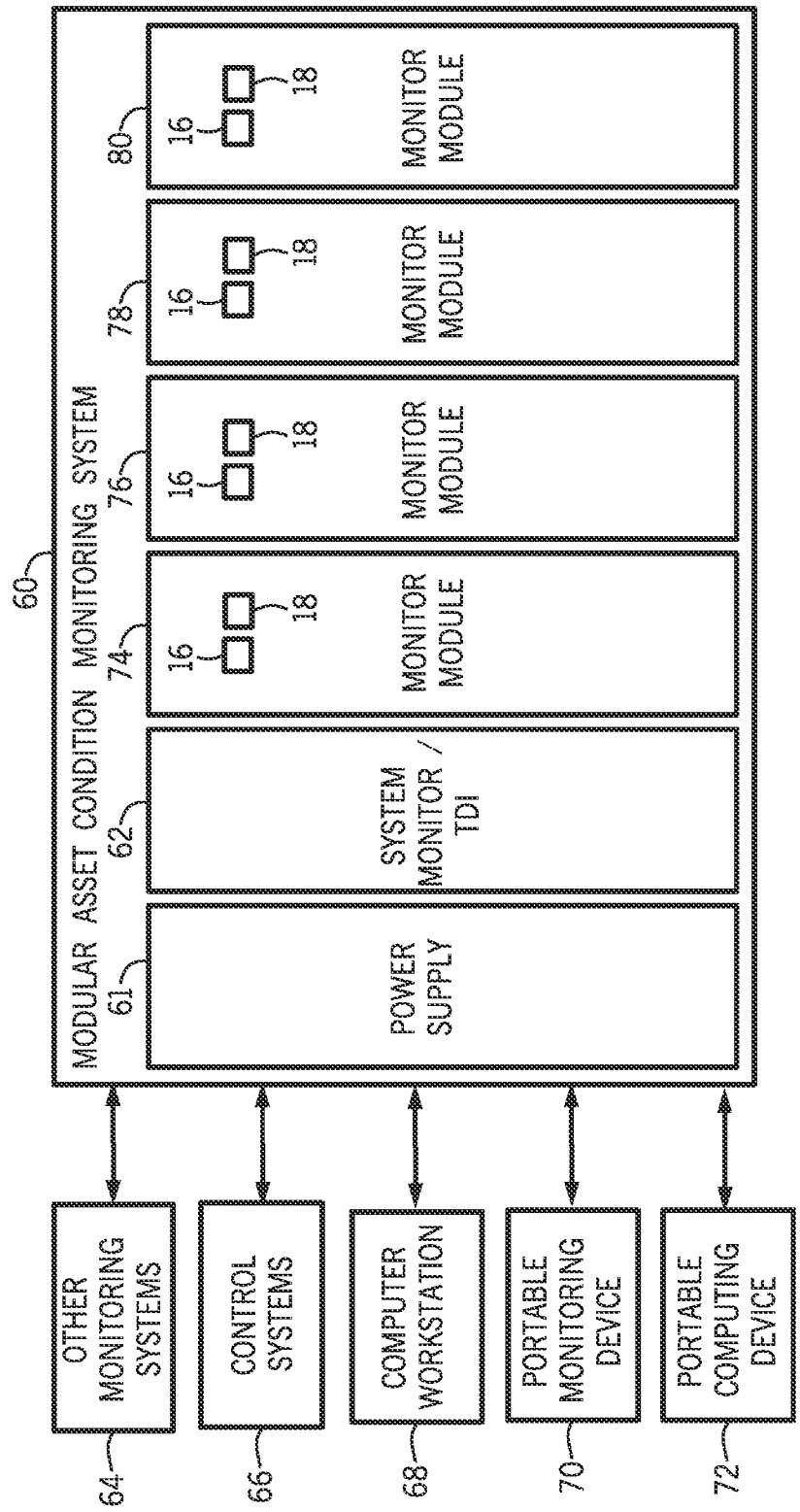
FIG. 2 is a diagram illustrating an embodiment of a modular asset condition monitor as well as other devices in communication with the monitor.

In addition to the power supply module 61 and the TDI 62, the monitoring system 60 illustrated in FIG. 2 also include a number of other modules, namely monitor modules 74, 76, 78, and 80, each an embodiment of the asset condition monitor 14 of FIG. 1. That is, each monitor module 74, 76, 78, and 80 may include a respective processor 16 and memory 18 configured to receive and process inputs from a variety of sensors (e.g., sensors 20, 22, 24, 26, 28, 30, and/or 32 of FIG. 1) to determine one or more operational parameters of the monitored mechanical device or system (e.g., gas turbine system 12). For example, monitor module 74 may include a number of channels (e.g., 4, 5, 6, 8, 10, 12, 16, 18, 20, or another suitable number of channels), each of which may receive input from a number of sensors to determine one of: radial vibration 34, radial position 36, axial position 38, eccentricity 40, differential expansion 46, rotor speed 48, rotor acceleration 50, or another suitable operational parameter of a mechanical system. By specific example, the monitor module 76 may include four channels, each of which may receive input from a number of sensors or determine one of case expansion or other types of differential expansion (e.g., standard single ramp differential expansion, non-standard single ramp differential expansion, dual ramp differential expansion, complementary differential expansion), axial position 38, and other positional measurements (e.g., valve position). By further example, the monitor module 78 may, in certain embodiments, include six channels, each dedicated to monitoring a particular temperature 52 in a portion of the monitored mechanical system.

Accordingly, each channel of a monitor module may receive a number (e.g., 1 to 500, 1 to 100, 1 to 50, or 1 to 20) of inputs from a number of sensors (e.g., sensors 20, 22, 24, 26, 28, 30, and/or 32) to determine an operational parameter of the mechanical system. It may further be appreciated that each channel may include a number (e.g., 1, 2, 4, 5, 6, 7, 8, or another suitable number) of underlying measurements that may be determined, based on received sensor input, in route to determining the overall operational parameter value for the mechanical system. For example, an embodiment of a four-channel monitor module (e.g., monitor module 74) may determine four operational parameters of the mechanical system; however, since, in certain embodiments, each channel may include 8 measurements, such a four-channel monitor may actually determine up to 32 individual measurements from the sensor input. By specific example, in certain embodiments, a radial vibration channel may determine up to 8 measurements, including a basic overall (direct) vibration amplitude, gap voltage, filtered amplitude (e.g., 1× filtered amplitude and 2× filtered amplitude), filtered phase (e.g., 1× filtered phase and 2× filtered phase), NOT 1× amplitude, and Smax (e.g., maximum phase). Further, it may be appreciated that alarm thresholds may be individually set for each measurement determined by each channel (e.g., Smax should remain below a threshold value to avoid an alarm condition). Other embodiments of monitor modules may include 1 to 100 (e.g., 1, 2, 3, 4, 5, 6, 7, 8, 9, 10, 11, 12, 13, 14, or 15) channels, each capable of determining 1 to 100 (e.g., 1, 2, 3, 4, 5, 6, 7, 8, 9, 10) measurements, to monitor an operational parameter of a mechanical system. Additionally, other embodiments of the modular monitoring system 60 may include, for example, 1 to 50, 1 to 25, 1 to 10, 1 to 8 monitor modules.

Figure 3:
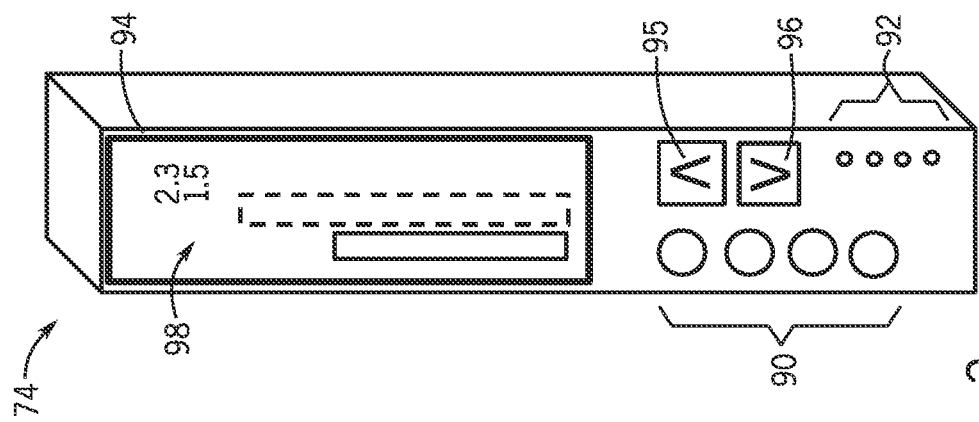
FIG. 3 is a perspective view of an embodiment of a module of the modular asset condition monitor of FIG. 2, including a screen for displaying a graphical user interface (GUI)

FIG. 3 illustrates a perspective view of an embodiment of the monitor module 74 of FIG. 2. The illustrated embodiment of the monitor module 74 includes four buffered output connections 90 (e.g., coaxial connections or other suitable connections) disposed on a front face of the monitor module 74 that may be coupled to portable test instrumentation by an operator. In other embodiments, the monitor module 74 may include any number of buffered output connections 90. Additionally, in certain embodiments, the monitor module 74 may also include a number of light emitting diodes (LEDs) 92 disposed on the front face of the monitor module 74 that may be used to indicate a status (e.g., normal, alert, connected, bypass, node voltage, "Not Ok", or a similar status) of the monitor module 74.

The illustrated monitor module 74 of FIG. 3 also includes a display device 94 that may be used to display information to an operator of the monitor module 74. For example, the display device may be a liquid crystal display (LCD), light-emitting diode (LED), organic light-emitting diode (OLED), or another suitable color display device. Further, the monitor module 74 also includes input devices (e.g., up arrow button 95 and down arrow button 96) that may be manipulated by an operator, for example, to control which of a number of screens of a graphical user interface (GUI) 98 is currently being displayed on the display device 94. In other embodiments, other input devices (e.g., buttons, dials, keyboards, mice, touch screens, or any other suitable input device) may additionally or alternatively be used with the module 74. As discussed in detail below, the GUI 98 may include screens for the names of the channels currently being monitored by the monitor module 74 as well as graphical representations for the measurements currently being collected by each of the channels.

Figure 5:
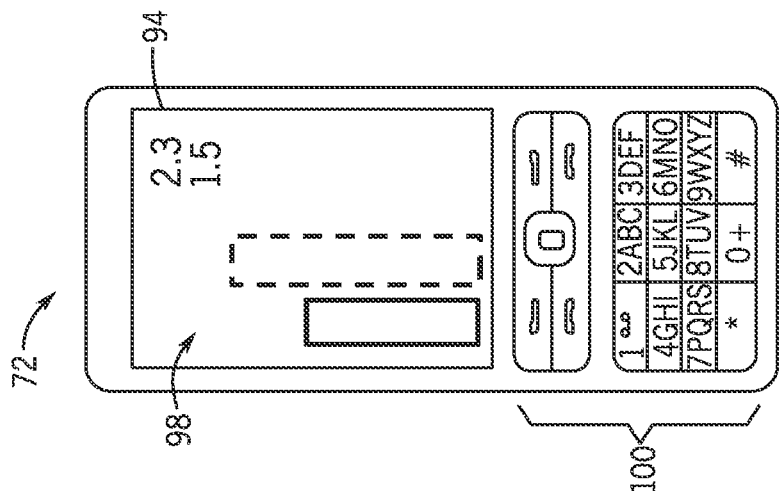
FIG. 5 is a perspective view of an embodiment of a portable computing device, including a screen for displaying a GUI.
Figure 4:
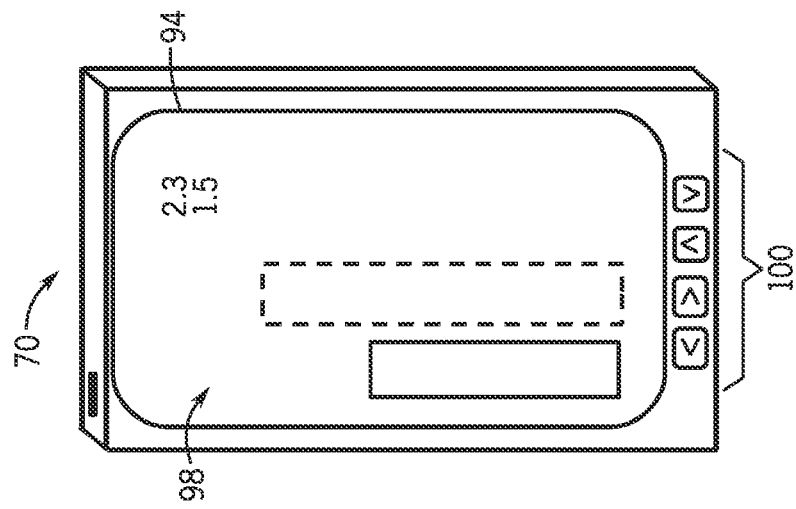
FIG. 4 is a perspective view of an embodiment of a portable monitoring device, including a screen for displaying a GUI.

It may be appreciated that, as illustrated in FIG. 2, in certain embodiments, other devices may be used to present the GUI 98. Accordingly, FIG. 4 illustrates a perspective view of an embodiment of the portable monitoring device 70, which may be a small, tablet-like device that may be used to present the GUI 98 to an operator. Similarly, FIG. 5 illustrates a perspective view of an embodiment of the portable computing device 72, which may be a smart phone, tablet, laptop, or similar mobile processing device. Both the portable monitoring device 70 of FIG. 4 and the portable computing device 72 of FIG. 5 may generally include a processor that may be used to execute instructions stored in a memory to present, on the respective display devices 94, the various screens of the GUI 98. Also, the portable monitoring device 70 and the portable computing device 72 may include communication circuitry (e.g., wireless networking circuitry) to allow the devices to communicate with the monitoring system 60 in order to present the GUI 98. Additionally, the portable monitoring device 70 and the portable computing device 72 may include user inputs 100 that may be used by an operator to, for example, control which screen of the GUI 98 is currently presented on the display device 94 of each device, respectively.

FIG. 6 illustrates an embodiment of the GUI 98 that may be displayed on one or more of the respective displays 94 of the monitor module 74 of FIG. 3, the portable monitoring device 70 of FIG. 4, and/or the portable computing device 72 of FIG. 5. As illustrated in FIG. 6, in certain embodiments, the GUI 98 may include a number of screens that are logically arranged in a continuous loop such that an operator may progressively cycle through all screens of the GUI 98 by continually pressing a user input (e.g., the up arrow button 95 or the down arrow button 96 illustrated in FIG. 3). As illustrated in FIG. 6, the first screen may be a measurement type screen 112, which may include a list (e.g., a visual representation) of the types of measurements currently being performed by the monitor (e.g., monitor module 74). For the illustrated embodiment, the measurement type screen 112 includes four measurement types, namely measurement type 114 (i.e., THRUST), measurement type 116 (i.e., ECCENTRICITY), measurement type 118 (i.e., RADIAL VIBRATION), and measurement type 120 (i.e., VELOCITY).

The GUI 98 illustrated in FIG. 6 includes a number of direct view screens 122, namely direct view screens 124, 126, 128, and 130, each of which may be respectively associated with a particular measurement type (e.g., one of measurement types 114, 116, 118, 120). For example, direct view screen 124 of FIG. 6 illustrates three graphical representations (e.g., bar graphs 131, 132, and 133), each representing a different overall thrust measurement currently being determined by different channels of the monitor module 74. By specific example, each of the overall measurements 131, 132, and 133 may provide a total or cumulative thrust measurement being determined by the monitor module 74 for three different components of the monitored mechanical system 12. Additionally, the illustrated direct view screen 124 includes a real-time value (RV) section 134 that may be used to present numerical values for the overall measurements 131, 132, and 133 illustrated on the direct view screen 124. It may be appreciated that, in other embodiments, the graphical representations may be line graphs, pie charts, Venn diagrams, or any other suitable graphical representations that may be presented on the display devices 94 discussed above. It may also be appreciated that the presentation of the data (e.g., the data scales, units, tick marks, etc.) on the discussed direct view screens are for illustrative purposes and are not intended to limit the present disclosure by conveying particular or relative values for the illustrated measurements.

It may be appreciated that the illustrated overall measurements illustrated in the GUI 98 of FIG. 6 (e.g., overall measurements 131, 132, and 133) may each represent an operational parameter of a particular measurement type (e.g., THRUST) being determined by one or more channels of the monitor module 74. In other words, the overall measurements 131, 132, and 133 may each represent a culmination of a number of underlying measurements that may be, as discussed above, determined by each channel based on inputs from one or more sensors. It may further be appreciated that, in certain embodiments, the GUI 98 may include additional screens for each of the measurements determined by each channel. For example, in certain embodiments, if each channel of the monitor module 74 includes 8 measurements (e.g., overall amplitude, gap voltage, 1× filtered amplitude, 2× filtered amplitude, 1× filtered phase, 2× filtered phase, NOT 1× amplitude, and Smax), 7 additional direct view screens may be inserted after each overall direct view screen (e.g., direct view screens 124, 126, 128, and 130) in the GUI 98 illustrated in FIG. 6. Further, it may be appreciated that, for such embodiments, each of the additional screen may illustrate multiple measurements of the same measurement type. For the illustrated embodiment, since the overall thrust direct view screen 124 illustrates three different overall measurements of the THRUST measurement type 114 via the bar graphs 131, 132, and 133, each additional screen (e.g., a gap voltage screen, a 1× filtered amplitude screen, a 2× filtered amplitude screen, a 1× filtered phase screen, a 2× filtered phase screen, a NOT 1× amplitude screen, and a Smax screen) associated with the THRUST measurement type 114 may similarly include three bar graphs, each corresponding to a measurement of a different component of the monitored mechanical system 12.

As illustrated in FIG. 6, direct view screen 126 includes a bar graphs 135 and 136, which graphically illustrate overall measurements of the ECCENTRICITY measurement type 116. Further, like the direct view screen 124, the illustrated direct view screen 126 includes a RV section 138 that may be used to present numerical values for the overall measurements illustrated by the bar graphs 135 and 136. The illustrated direct view screen 128 includes bar graphs 139, 140, 141, and 142 representing overall measurements of the RADIAL VIBRATION measurement type 118. The direct view screen 128 further includes a RV section 144 to present numerical values for the overall measurements illustrated by bar graphs 139, 140, 141, and 142. Further, the illustrated direct view screen 130 includes a bar graph 146 representing a single overall measurement of the VELOCITY measurement type 120, as well as a RV section 148 to present the numerical value for the overall measurement illustrated by the bar graph 146. As such, it may be appreciated that any of the direct view screens 122 may include any number of (e.g., 1, 2, 3, 4, 5, 6, 7, 8, 9, 10 or more) graphical representations (e.g., bar graphs) to illustrate multiple measurements of the same measurement type.

Additionally, as mentioned above, an operator may navigate through the various screens of the GUI 98 using, for example, the user inputs 95 and/or 96, illustrated in FIG. 3. As such, as illustrated for the embodiment of FIG. 6, the GUI 98 includes a number of directional arrows 150 that connect each of the screens 112, 124, 126, 128, and 130, to one another to indicate which screen may be subsequently presented based on the input provided by the operator. For example, as illustrated for the embodiment of FIG. 6, when viewing screen 112, if the GUI 98 receives operator input from the down arrow button 96, the GUI 98 may discontinue presentation of the screen 112, and may proceed with presenting the screen 124. Then, when the GUI 98 is presenting the screen 124, if the GUI 98 receives operator input from the down arrow button 96 once again, then the GUI 98 may cause the display 94 to present the screen 126. However, if, when the GUI 98 is presenting the screen 124, the GUI 98 instead receives operator input from the up arrow button 95, then the GUI 98 may cause the display 94 to present the screen 112 once again. As such, as indicated by the directional arrows 150, the GUI 98 may be logically arranged as a continuous loop that allows the operator to cycle through the various screens of the GUI 98 using, for example, a single user input (e.g., up arrow button 95 or down arrow button 96). It may be appreciated that the layouts illustrated by FIG. 6 are merely provided as examples, and that in certain embodiments, other arrangements of screens and/or other arrangements of the elements on the screens may be utilized within the GUI 98.

With the foregoing in mind, it may be appreciated that, when an operator is viewing a particular screen of the GUI 98, the amount of information that may be presented may be limited, for example, by the size of the display device 94. For example, when the operator is viewing the measurement type screen 112 illustrated in FIG. 6, the operator may not be capable of concurrently viewing the information contained on the direct view screen 128 of the GUI 98. As such, as illustrated in FIG. 6, an operator viewing the measurement type screen 112 may be unaware that one or more measurements of the RADIAL VIBRATION measurement type 118, associated with the direct view screen 128, are experiencing an irregular status. As used herein, an irregular status may refer, for example, a currently alarming status (e.g., a measurement having a value currently beyond a predetermined threshold value), a latched alarm status (e.g., a measurement having a value that has previously exceeded the predetermined threshold value for which the alarm has not been cleared), a bypass status (e.g., a measurement that is temporarily not being determined), or any other status that is not a normal or healthy status. As such, present embodiments enable methods of encoding additional information in the presentation of the screens of the GUI 98 (e.g., the measurement type screen 112), such that an operator may be able to glean additional information regarding the statuses of the various measurements being determined by each channel in an efficient manner.

For example, FIGS. 7-10 illustrate embodiments of the measurement type screen 112 presented in FIG. 6. In particular, FIGS. 7-10 illustrate measurement type screen embodiments 112A-D, in which a particular measurement type 118A-D has one or more measurements in an irregular state (e.g., a currently alarming status, a latched alarm status, a bypass status, or any other irregular status). In other words, for the embodiments of the measurement type screens 112A-D respectively illustrated in FIG. 7-10, the representations for the RADIAL VIBRATION measurement type (e.g., representations 118A-D) are illustrated in a different or emphasized manner to indicate that one or more measurements associated with the RADIAL VIBRATION measurement type 118 are in an irregular state. It may be appreciated that the modified representation of a measurement type (e.g., representations 118A-D) may represent a combined status of several individual measurements (e.g., measurements illustrated by bar graphs 139, 140, 141, and 142) associated with the RADIAL VIBRATION measurement type 118.

Figure 7:
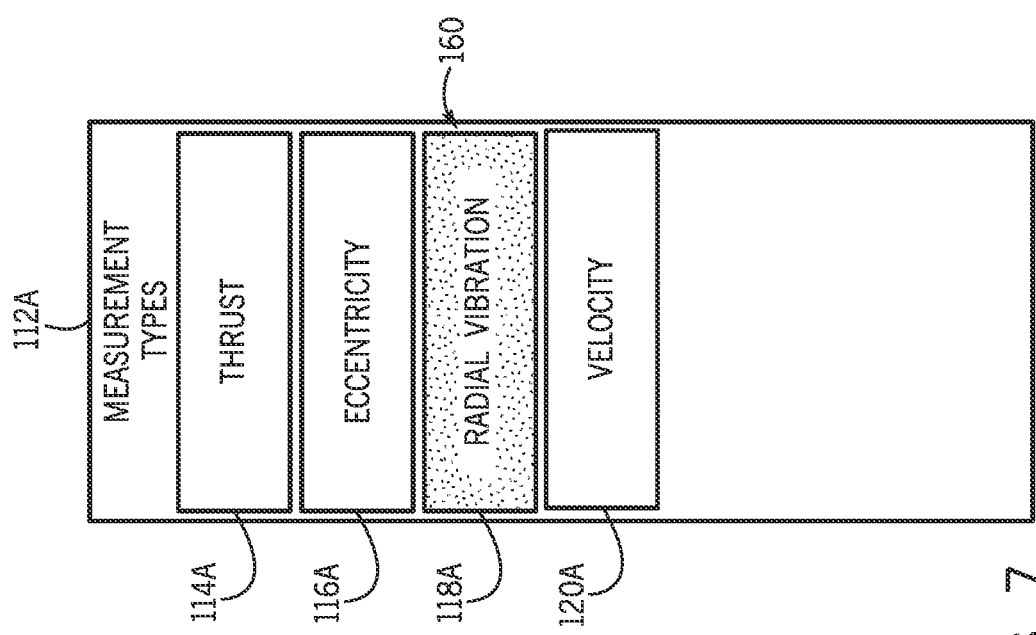
FIG. 7 is a screen view of an embodiment of a measurement type screen of the GUI, wherein a background color is used to emphasize an irregular status of one or more measurements of a particular channel.

For example, FIG. 7 illustrates an embodiment of the measurement type screen 112A, in which the names of each of the measurement types that do not have a measurement with an irregular status (e.g., measurement types 114A, 116A, and 120A), are presented with a normal background color. In contrast, measurement type 118A is a measurement type having at least one measurement with an irregular status (e.g., a currently alarming status, a latched alarm status, a bypass status, or any other irregular status). Accordingly, for the embodiment illustrated in FIG. 7, the measurement type 118A is presented with an altered background color 160, wherein the background color 160 may be used to provide an indication of the severity of the irregular status. In certain embodiments, the indication of severity may be based on, for example, a number of measurements having an irregular status, an amount of time that the measurements have had an irregular status, how far beyond the threshold values the measurements have reached, or similar indication of severity, for each of the measurements determined by the channel.

For example, in certain embodiments, a background color 160 of blue for the representation 118A may indicate that a radial vibration measurement or a combination of radial vibration measurements may have a bypass status, while a background color 160 of yellow may indicate that a radial vibration measurement or a combination of radial vibration measurements may have a latched alarm status, and a background color 160 of red may indicate that a radial vibration measurement or a combination of radial vibration measurements may have a currently alarming status. By further example, in certain embodiments, a background color 160 of yellow for the representation 118A may indicate that a radial vibration measurement or a combination of radial vibration measurements have barely exceeded their respective threshold values, and a background color 160 of red may indicate that a radial vibration measurement or a combination of radial vibration measurements have greatly exceeded their respective threshold values. Accordingly, the background color 160 may provide both a visual indication of the severity of the combined measurement status of the radial vibration measurement type 118A. It should be appreciated that colors set forth above are merely provided as examples, and that, in other embodiments, other background colors 160 (e.g., yellow, magenta, purple, orange, teal, black, cyan, green, or any other suitable color) may be utilized to indicate a particular status or combination of statuses for the measurements of channel 118A. Additionally, in certain embodiments, a particular color 160 (e.g., yellow) may be used to convey an irregular status, while the brightness of the color may be increased (e.g., from a dark yellow to a bright yellow) with increasing criticality. Further, it may be appreciated that, in certain embodiments, when the statuses of the measurements of the radial vibration measurement type return to a normal or healthy status (e.g., a measurement value moves away from the threshold value, a latched alarm is cleared, and so forth), the background color 160 of the representation 118A may return to a normal or non-emphasized state.

Figure 8:
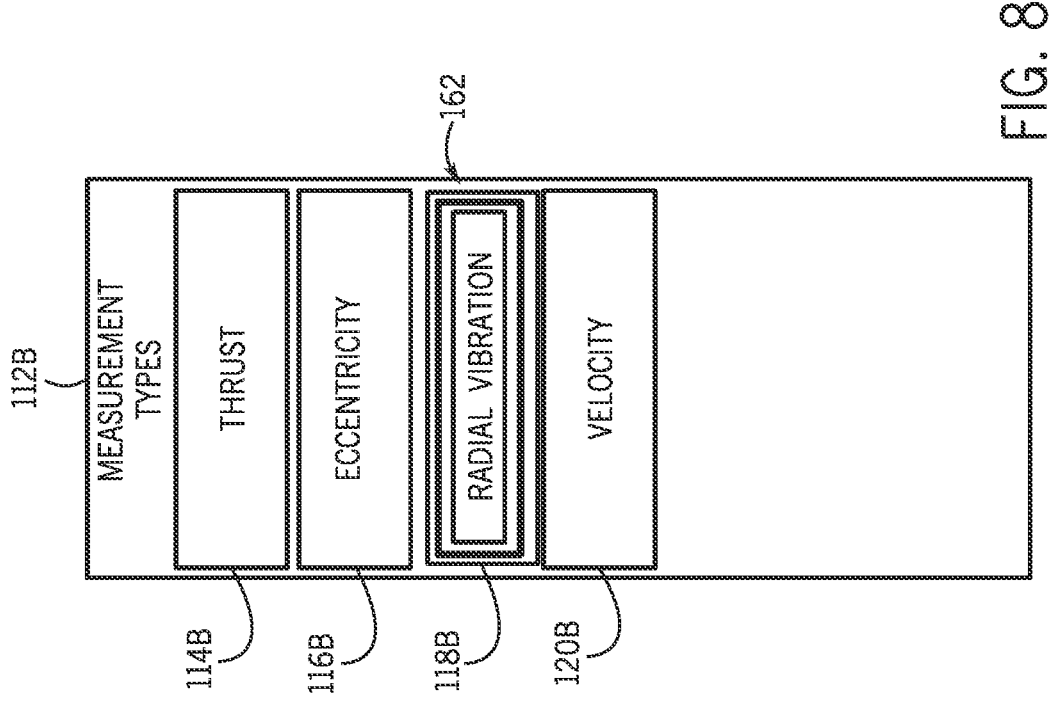
FIG. 8 is a screen view of another embodiment of the measurement type screen of the GUI, wherein a border or outline is used to emphasize an irregular status of one or more measurements of a particular channel.

By further example, FIG. 8 illustrates an embodiment of the measurement type screen 112B, in which the representations for measurement types lacking a measurement having an irregular status (e.g., representations 114B, 116B, and 120B) may be presented without emphasis. In contrast, the RADIAL VIBRATION measurement type has a radial vibration measurement or a combination of radial vibration measurements with an irregular status (e.g., a currently alarming, latched alarm, and/or a bypass status). Accordingly, as illustrated in FIG. 8, the representation 118B of the RADIAL VIBRATION measurement type includes an additional border or outline 162 to indicate the irregular status of one or more radial vibration measurements. It may be appreciated that the border 162 represents an example of a feature that might be added to the representation 118B to indicate the irregular status of one or more radial vibration measurement and, in other embodiments, other features may involve the inclusion of additional characters before and/or after the channel 118B (e.g., exclamation marks, asterisks, or other characters that may otherwise emphasize the channel 118B), the use of other fonts or font emphases (e.g., a larger font, a different font, a bold font, an italic font, an underlined font, font color, or another font or font emphasis), or any other suitable method of emphasizing the representation 118B relative to the other representations 114B, 116B and 120B.

Figure 9:
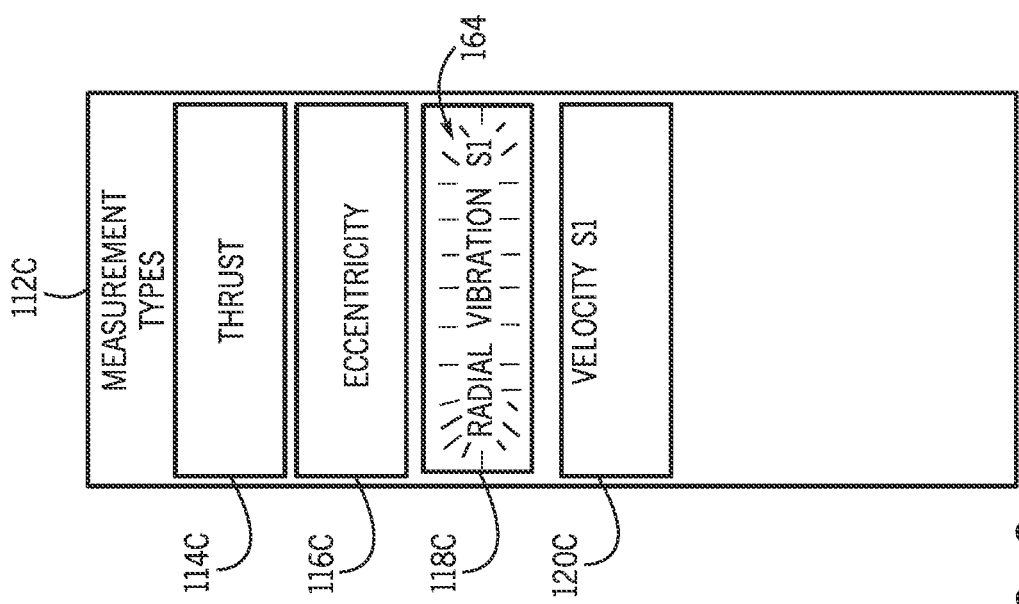
FIG. 9 is a screen view of another embodiment of the measurement type screen of the GUI, wherein an flashing animation is used to emphasize an irregular status of one or more measurements of a particular channel.

By further example, FIG. 9 illustrates another embodiment of the measurement type screen 112C, in which the representations for measurement types lacking a measurement having an irregular status (e.g., representations 114C, 116C, and 120C) may be presented without any animated emphasis. In contrast, the RADIAL VIBRATION measurement type includes a radial vibration measurement or a combination of radial vibration measurements with an irregular status (e.g., a currently alarming, latched alarm, and/or a bypass status). Accordingly, as illustrated in FIG. 9, the representation 118C may be illustrated with a blinking, flashing, or strobing effect (as indicated by lines 164) to convey the irregular status of the one or more radial vibration measurements. It may be appreciated that the blinking 164 represents an example of an animated emphasis that might be used when illustrating the representation 118C and, in other embodiments, other animated emphases may involve an partially or completely animated border, portions of the representation 118C disappearing and reappearing in a repetitive manner, portions of the representation 118C changing color in a repetitive manner, portions of the representation 118C changing in brightness or luminosity in a repetitive manner, or any other suitable method of animated emphasis. As with other methods described, the degree of the animated emphasis (e.g., the frequency of the repetition of the animated effect, the rate of color changes, and so forth) may be adjusted based on the severity of the irregularities (e.g., number of measurements with an irregular status, an amount of time that the measurements have had an irregular status, how far beyond the threshold values the measurements have reached, or similar indication of severity).

Figure 10:
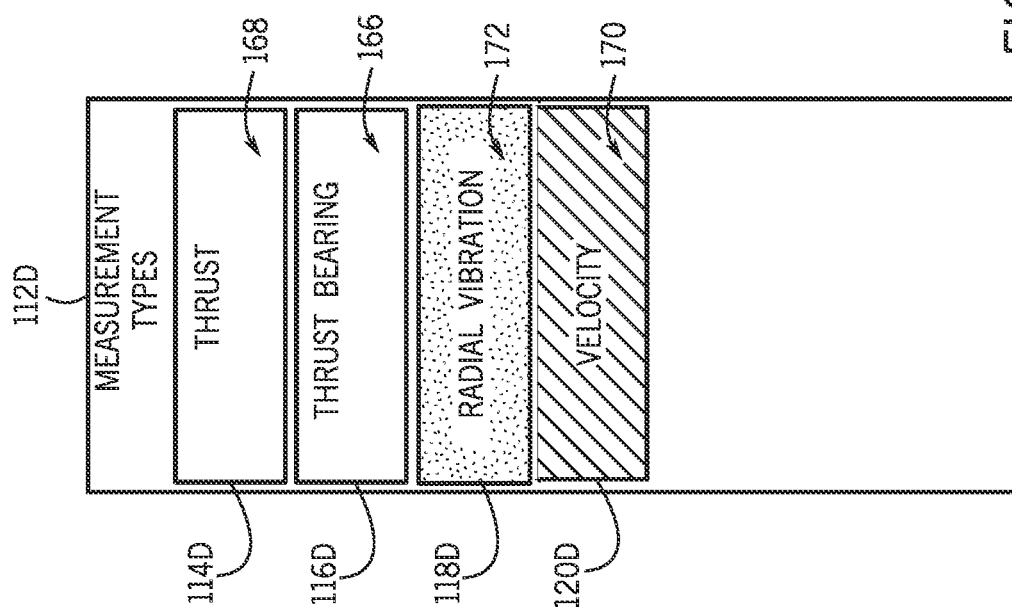
FIG. 10 is a screen view of another embodiment of the measurement type screen of the GUI, wherein a background color is used to emphasize an irregular status of one or more measurements of a particular channel.

By still further example, FIG. 10 illustrates another embodiment of the measurement type screen 112D. The embodiment of the measurement type screen 112D illustrated in FIG. 10 uses background color to convey a combined measurement status of each measurement type. For example, as illustrated in FIG. 10, in certain embodiments, a lighter background color may be used to convey a less critical status and/or a less severe condition, while a darker background color may be used to convey a more severe combined measurement status. By specific example, as illustrated in FIG. 10, each channel 114D, 116D, 118D, 120D of the measurement type screen 112D is illustrated as having a particular background color. That is, representation 116D of FIG. 10 is illustrated as having a completely white background color 166, which may denote that the ECCENTRICITY measurement type has a combined measurement status of normal or healthy (e.g., no measurements at respective threshold values). The representation 114D is illustrated as having a slightly darker background 168, which may indicate that the THRUST measurement type has a currently alarming combined measurement status with a low severity (e.g., one or more measurements have not had the currently alarming status for long or one or more measurements are moving away from the threshold value). The representation 120D is illustrated as having an even darker background 170, which may convey that the VELOCITY measurement type has a latched alarm combined measurement status with a low severity (e.g., one or more measurements have latched alarm, but are no longer beyond their respective threshold values). The representation 118D is illustrated as having the darkest background color 172, which may indicate that the RADIAL VIBRATION measurement type has a currently alarming status with a high severity (e.g., one or more measurements continue to exceed threshold value for an extended period of time and/or by a large quantity).

Additionally, it may be appreciated that, in certain embodiments, any number of different hues, tints, colors, and so forth may be used to convey relative combined measurement status information. For example, in certain embodiments, green backgrounds may be used for measurement types having a combined measurement status of normal, yellow to orange backgrounds may be used for measurement types having a latched alarming combined measurement status, and red backgrounds may be used for measurement types having a combined measurement status of currently alarming. It should be appreciated that, while the use of different background colors are presently disclosed, in other embodiments, other colors (e.g., foreground colors, font colors, border colors, or another element color) may additionally or alternatively be adjusted to convey this information. Further, in certain embodiments, more than one form of emphasis (e.g., as presented in FIGS. 7-10) may be combined in various manners in order to convey a combined measurement status of each measurement type.

Technical effects of the present approach include enabling an operator to glean more information from screens of a GUI displayed on a display device of an industrial monitoring system. For example, the present approach enables an operator to visually ascertain a status of one or more measurements of a particular measurement type based on the manner in which the representation of the measurement type is illustrated (e.g., in a measurement type screen). By further example, the present approach provides examples of emphases (e.g., background colors, foreground colors, additional characters, font emphases, animation emphases, and so forth) that may be used to convey to the operator a combined status of the measurements of each measurement type, such that the operator may be able to quickly ascertain the combined status of the measurements of each measurement type without having to navigate to a particular direct view screen. Accordingly, present embodiments enable an operator viewing, for example, a measurement type screen to know if one or more measurements of any measurement type are in an irregular status without having to cycle through each screen of the GUI.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an industrial monitor communicatively coupled to at least one sensor that is coupled to a mechanical system, wherein the industrial monitor is configured to determine a category of measurements of an operational parameter of the mechanical system, wherein the category of measurements is associated with one or more measurements related to the operational parameter as one or more inputs received from the at least one sensor; and
a display device communicatively coupled to the industrial monitor, wherein the display device is configured to display the category of measurements determined by the industrial monitor, wherein the category of measurements is displayed having an appearance that denotes a combined status of the one or more measurements associated with the category of measurements, wherein the combined status is based at least in part on measured values of the one or more measurements relative to respective threshold values of the one or more measurements, wherein the appearance of the category of measurements is altered to emphasize at least one visual aspect relative to at least one visual aspect of a second appearance of a second category of measurements associated with one or more second measurements related to a second operational parameter of the mechanical system when the measured values of the one or more measurements exceed the respective threshold values of the one or more measurements.

2. The system of claim 1, wherein the display device is configured to display the category of measurements as a list comprising a corresponding name for each of the category of measurements and the second category of measurements, wherein each name of the list denotes the combined status.

3. The system of claim 1, comprising a modular monitoring system, wherein the modular monitoring system comprises a plurality of monitor modules, and wherein the plurality of monitor modules comprises the industrial monitor.

4. The system of claim 1, wherein the display device is disposed on a portable monitoring device, a mobile computing device, a smart phone, or the industrial monitor.

5. The system of claim 1, wherein the appearance of the category of measurements progressively changes to represent an increasing criticality of the combined status of the one or more measurements associated with the category of measurements.

6. The system of claim 1, wherein the at least one visual aspect of the appearance comprises a background color, a foreground color, a font emphasis, an animated emphasis, an indicator bar, an outlined appearance, or a combination thereof.

7. The system of claim 1, wherein the display device is configured to present a plurality of direct view screens, each associated with a respective one of the category of measurements or the second category of measurements, wherein each direct view screen is configured to graphically illustrate at least a portion of respective one or more measurements determined by the industrial monitor.

8. The system of claim 1, wherein the combined status of the one or more measurements comprises a healthy status, a currently alarming status, a latched alarm status, a bypass status, or a combination thereof, wherein the healthy status denotes that the one or more measurements do not exceed their respective threshold values and the currently alarming status denotes that one or more of the one or more measurements exceeds their respective threshold values.

9. The system of claim 1, wherein the mechanical system comprises a gas turbine system, a steam turbine system, a hydraulic turbine system, a wind turbine system, or an industrial automation system.

10. The system of claim 1, wherein the industrial monitor is configured to determine the second category of measurements.

11. A method, comprising:
receiving inputs from a plurality of sensor devices coupled to a mechanical device;
determining a plurality of measurements for the mechanical device based on the received inputs, and wherein each measurement of the plurality of measurements is associated with a respective measurement status and a respective measurement category; and
displaying a user interface on a display device, wherein the user interface is configured to display a list of measurement categories associated with the plurality of measurements, wherein each measurement category in the list of measurement categories is presented with at least one visual aspect that is configured to progressively change to indicate the respective measurement status of the measurements associated with the measurement category, wherein the measurement status is based at least in part on the measurements relative to respective threshold values, wherein the at least one visual aspect associated with a first measurement category is altered to emphasize the at least one visual aspect relative to a visual aspect associated with a second measurement category when one or more of the measurements associated with the first measurement category exceeds the respective threshold values.

12. The method of claim 11, wherein the at least one visual aspect comprises a background color, a foreground color, or a combination thereof.

13. The method of claim 11, wherein the at least one visual aspect comprises an animated emphasis, a font emphasis, additional characters, or a combination thereof.

14. The method of claim 11, wherein the display device is disposed on a module of a condition monitor, a portable monitoring device, a mobile computing device, or a combination thereof.

15. The method of claim 11, wherein the mechanical device comprises an axial compressor, a screw compressor, a gear box, a turbo-expander, a horizontal or vertical centrifugal pump, an electric motor, a generator, a fan, a blower, an agitator, a mixer, a centrifuge, a pulp refiner, a ball mill, a crusher, a pulverizer, an extruder, a pelletizer, a cooling tower, or a heat exchanger.

16. A non-transitory, computer-readable medium storing instructions executable by a processor of an electronic device, the instructions comprising:
instructions to receive at least one input from at least one sensor coupled to a mechanical system;
instructions to determine a plurality of measurements, wherein each measurement of the plurality of measurements is associated with a measurement category of a plurality of measurement categories, based on the at least one input received from the at least one sensor; and
instructions to present, on a display device, a representation for each of the plurality of measurement categories that includes a visual indication of a combined measurement status of the measurements associated with a respective measurement category, wherein the combined measurement status is based at least in part on the measurements relative to respective threshold values, wherein the visual indication associated with a first measurement category is altered to emphasize at least one visual aspect relative to at least one visual aspect of a second visual indication of at least one other measurement category of the plurality of measurement categories when the measurements associated with the first measurement category exceed the respective threshold values.

17. The medium of claim 16, wherein the combined measurement status associated with the first measurement category comprises a combined healthy status, a combined currently alarming status, a combined latched alarm status, or a combination thereof, based on the inputs received from the at least one sensor.

18. The medium of claim 17, wherein the visual indication indicates a combined healthy status, a combined currently alarming status, or a combined latched alarm status.

19. The medium of claim 18, wherein the first visual indication comprises a first background color indicating the combined healthy status, a second background color indicating the combined currently alarming status, and a third background color indicating the combined latched alarm status.

20. The medium of claim 16, wherein the visual indication of the combined measurement status indicates a severity of the combined measurement status of the measurements associated with the respective measurement category.

* * * * *